United States Patent [19]

Mraz

[11] Patent Number: 4,771,880
[45] Date of Patent: Sep. 20, 1988

[54] BELT STORAGE UNIT

[75] Inventor: Dennis Mraz, Saskatoon, Canada

[73] Assignee: DM Enterprises Inc., Saskatoon, Canada

[21] Appl. No.: 839,944

[22] Filed: Mar. 17, 1986

[30] Foreign Application Priority Data

Mar. 20, 1985 [CA] Canada .................................. 476985

[51] Int. Cl.⁴ .............................................. B65G 21/14
[52] U.S. Cl. ..................................... 198/812; 198/313
[58] Field of Search ................ 198/812, 313, 588, 594

[56] References Cited

U.S. PATENT DOCUMENTS

| 1,453,393 | 5/1923 | Jessen . | |
| 2,826,290 | 3/1958 | Barski . | |
| 2,852,127 | 9/1958 | Barrett . | |
| 2,893,539 | 7/1959 | Baechli . | |
| 2,904,164 | 9/1959 | Bergmann et al. . | |
| 3,289,816 | 12/1966 | Baechli . | |
| 3,303,925 | 2/1967 | Baechli | 198/812 |
| 3,352,406 | 11/1967 | Long . | |
| 3,621,983 | 11/1971 | Arentzen et al. . | |
| 3,664,488 | 5/1972 | Florian et al. . | |
| 3,826,353 | 7/1974 | Greasley . | |
| 3,935,941 | 3/1976 | Keck . | |
| 4,245,738 | 1/1981 | Butcher et al. | 198/812 |
| 4,474,287 | 10/1984 | Thompson | 198/812 |

FOREIGN PATENT DOCUMENTS

| 172930 | 11/1916 | Canada . | |
| 443862 | 4/1947 | Canada . | |
| 547610 | 10/1957 | Canada . | |
| 552728 | 2/1958 | Canada . | |
| 553888 | 3/1958 | Canada . | |
| 559335 | 6/1958 | Canada . | |
| 675673 | 12/1963 | Canada . | |
| 755443 | 3/1967 | Canada . | |
| 905879 | 7/1972 | Canada . | |
| 958669 | 12/1974 | Canada . | |
| 986871 | 4/1976 | Canada . | |
| 1143321 | 3/1983 | Canada . | |
| 1556603 | 3/1970 | Fed. Rep. of Germany . | |
| 0908672 | 3/1982 | U.S.S.R. | 198/812 |

Primary Examiner—Robert J. Spar
Assistant Examiner—Lyle Kimms
Attorney, Agent, or Firm—Welsh & Katz, Ltd.

[57] ABSTRACT

There is described an extensible belt take-up and storage device for use in an extensible belt conveyor system. The device overcomes the shortcomings of the prior art by being very compact and by having a configuration such that almost all the stored belt can be let out to the conveyor system. To accomplish this first and second sets of rollers are mounted on a fixed and on a movable frame respectively and the rollers are mounted parallel to each other and inclined at an acute angle to the horizontal axis of the device.

11 Claims, 2 Drawing Sheets

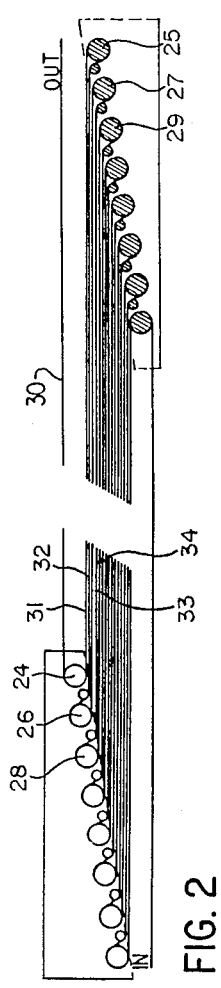
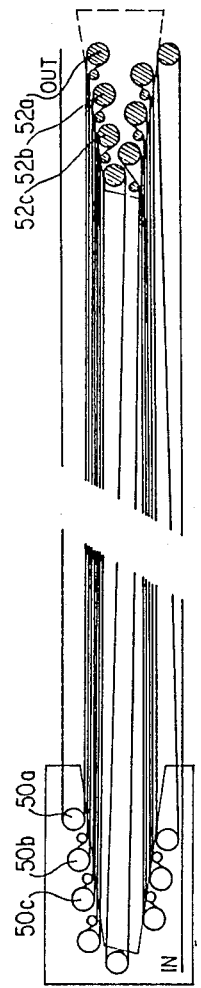
FIG. 2
FIG. 4
FIG. 1
FIG. 3

BELT STORAGE UNIT

BACKGROUND OF THE INVENTION

The present invention relates to extensible belt conveyor devices and particularly to a belt take-up and storage unit for use in an extensible belt conveyor system.

In endless belt systems, for example those used in mining operations it is necessary to provide for a variable length conveyor belt, for example when a conveyor belt is used in association with a continuous miner, it is necessary to extend the belt as the continuous miner moves farther into the mine shaft. Belt storage units are well known in the conveyor belt art, such devices being insertable into a conveyor belt system.

In U.S. Pat. No. 3,352,406 there is shown a device in which a fixed belt pulley section and a movable belt pulley section are provided, the movable belt pulley section being movable horizontally relative to the fixed belt section and as it moves away from the fixed belt section it takes up more belt from the conveyor. The fixed pulley or roller section provides a series of inclined rollers and the movable belt section provides a further plurality of belt receiving rollers. The fixed and movable rollers forming, when the movable section is closed to the fixed section a roller pattern similar to an inverted V configuration.

Another belt take-up device is shown in U.S. Pat. No. 3,621,983 which again has a fixed roller section and a movable roller section, the conveyor belt being stored on the rollers and as the movable section moves away from the fixed section more belt is taken up out of the conveyor and as the movable section moves towards the fixed section more belt is paid out into the conveyor. The rollers in the fixed and movable sections are of a configuration similar to a V on its side with the apex of the V on the fixed section facing the apex of the V on the movable section.

U.S. Pat. No. 4,474,287 shows a telescoping device for cable storage.

The problem with existing devices has been that they are extremely wasteful with space and an object of the present invention is to provide a belt storage device in which space is used economically and in which the majority of the belt stored in the storage device, is available for use in the conveyor.

SUMMARY OF THE INVENTION

According to the present invention there is provided in an endless conveyor belt storage device having a fixed and a movable frame mounted for horizontal movement relative to said fixed frame and having a first set of rollers mounted on said fixed frame and a second set of rollers mounted on said movable frame, the improvement wherein said first and second sets of rollers are mounted on their respective frames parallel to each other and inclined at an acute angle to the horizontal axis of the device.

According to one aspect of the invention a third set of rollers may be mounted on the fixed frame and a fourth set of rollers may be mounted on the movable frame, the third and fourth sets of rollers being parallel to each other and inclined to the horizontal axis of the device, in mirror image configuration to the first and second sets of rollers.

According to a further aspect of the invention third and fourth sets of rollers may be mounted beneath the first and second sets and a fifth set of rollers may be mounted on the fixed frame and a sixth set of rollers mounted on the movable frame beneath the third and fourth sets of rollers, the fifth and sixth sets of rollers being parallel to each other and parallel to the first and second sets of rollers.

Conveniently the sets of rollers comprise belt entraining rollers and smaller diameter belt spacing rollers adjacent thereto. The acute angle may, conveniently be between 10° and 20°.

According to a preferred feature of the invention there is provided in an endless conveyor belt storage device having a fixed and a movable frame mounted for horizontal movement relative to the fixed frame and having a first set of rollers mounted on the movable frame, the improvement wherein the first and second sets of rollers are mounted on their respective frames parallel to each other and inclined at an acute angle to the horizontal axis of the device, individual rollers of the set on said fixed frame being paired with individual rollers of the set on the moving frame, each pair of rollers having the same center-to-center distance as every other pair, the pairs, in operation, supporting vertically spaced belt runs of equal length.

BRIEF DESCRIPTION OF THE DRAWINGS

The following is a description by way of example of certain embodiments of the present invention reference being had to the accompanying drawings in which:

FIG. 1 is a schematic representation of one embodiment of the present invention with a roller carrying moving frame being moved adjacent a roller carrying fixed frame;

FIG. 2 is the same device as shown in FIG. 1 but with the movable frame extended to the right of the fixed frame to take-up and store an endless conveyor belt;

FIG. 3 is a schematic representation of a second embodiment of the invention in which fixed and movable rollers are mounted in a v-shaped configuration;

FIG. 4 shows the position occupied by the rollers of FIG. 3 when the moving frame is moved to the right to the extended position;

GENERAL DESCRIPTION

Figure 6:
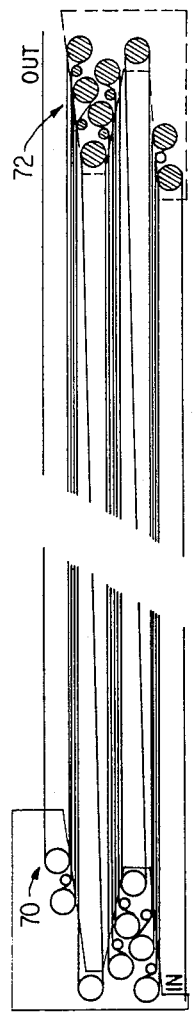
FIG. 6 shows the rollers of FIG. 5 in the extended belt storage position.

Turning now to the drawings. In FIG. 1 there is shown, schematically an endless conveyor belt take-up and storage device capable of being inserted into a conveyor belt system such as would, for example, follow a continuous miner. The device has a fixed frame 10 which carries a first set of belt entraining rollers 11 and a moving frame 12 carrying a second set of belt entraining rollers 13. The configuration of fixed and moving frames, and actuators to move the frames and such ancillary equipment as belt tensioning devices, are so well known in the art as not to require description here.

The first set of rollers 11, on the fixed frame 10 are mounted at an acute angle, say, between 10° and 20° to the horizontal, and comprises larger belt entraining rollers 20 and smaller diameter belt spacing (or snubber) rollers 22.

The rollers on the movable frame 12 are parallel and inclined at the same angle as the fixed set of rollers 11 and individual rollers 24, 25, 26, 27, 28, 29, etc. form individual roller pairs the center-to-center distance between the rollers 24 and 25 being the same as the center-to-center distance between the rollers 26 and 27 of the second pair and the same as the center-to-center distance between the rollers 28 and 29 of the third pair, and so on. As seen in FIG. 2 when the moving frame is moved to the right to take-up and store conveyor belt 30 the center-to-center distance between the roller 24 and its paired mate 25 is the same as the center-to-center distance between the roller 26 and its paired mate 27 and the roller 28 and its paired mate 29. This ensures that the roller pair support, in operation, the belt stored conveyor belt in vertically spaced runs of equal length 31, 32, 33, 34, etc.

It will be seen in FIG. 1 that when the movable frame 12 is moved to the left to pay-out the conveyor belt 30, it moves snugly into position adjacent the fixed frame 10 and the stored belt is efficiently distributed out into system, a minimum amount of belt being retained in the rollers in the compressed position.

Figure 5:
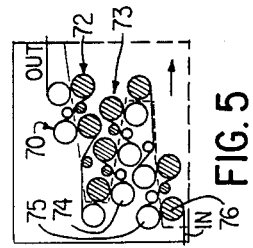
FIG. 5 is a schematic representation of belt entraining rollers on fixed and movable frames mounted in a "Z" arrangement.

The V configuration shown in FIGS. 3 and 4 and the Z configuration shown in FIGS. 5 and 6 are utilized when more head room is available than horizontal length such as in a mine, or the like, where the belt is being used. The type of configuration will be selected for the type of operation to be performed.

In FIGS. 3 and 4 the fixed first set of rollers 50 are provided on the fixed frame and a movable second set of rollers 52 are provided on the movable frame. The set of rollers 52 being parallel with the rollers 50 and inclined to the horizontal axis of the device between about 10° and 20°. The belt entraining rollers 50 and 52 have spacer, or snubber, rollers 54, 56. Mounted on the fixed frame is a third set of rollers 58 and parallel and inclined at the same angle of between 10° to 20° to the horizontal are a set of movable rollers 60. The movable rollers 60 are beneath the movable rollers 52 and above the fixed rollers 58. As will be seen in FIG. 3 the movable rollers 52, 60, when the conveyor belt has been paid out, fit snugly with its V configuration nestling into the V configuration of the fixed rollers 50, 58. In the extended position with the movable frame moved by an actuator to the right, it will be noted that fixed roller 50a forms a pair with movable roller 52a and fixed roller 50b forms a pair with movable roller 52b and fixed roller 50c forms a pair with movable roller 52c and so on. The center-to-center distance between the pairs of rollers 50a, 52a; 50b, 52b; 50c, 52c are the same and it will be seen that the belts are entrained in substantially horizontal fashion will the snubber, or spacing rollers, 54 and 56 maintaining the spacing, or clearance, between adjacent belt runs so that the minimum amount of spacing is maintained consistent with good belt run clearance.

Turning to FIGS. 5 and 6, here the bent entraining roller arrangement is of a substantial 'Z' configuration, with the first set of fixed rollers 70, on the fixed frame being parallel to and inclined at the same angle or between 10° and 20° to the horizontal with the movable second set of rollers 72. A third set of rollers 73 is parallel to and inclined at the same angle of 10° to 20° to the horizontal with a fourth set of rollers 74 and a fifth set of rollers 75 is parallel to and inclined at an angle of 10° to 20° to the horizontal with a sixth set of roller 76 being parallel thereto and to the first and second sets of rollers 70, 72. Again the center-to-center distance between roller pairs is kept the same as in previous embodiments.

Figure 7:
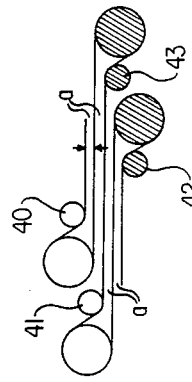
FIG. 7 is a detail showing the spacing of belt runs on the rollers.

In FIG. 7 it will be seen that the snubber, or spacing, rollers 40, 43, 42, 41 maintain a spacing (a) between the belt run that passes over the snubber and the belt run that passes over the bending rollers. In the compressed, or closed condition, such as seen in FIG. 5 again it will be observed that the minimum amount of belt is stored in the rollers and the maximum amount of belt is usable in the conveyor. As will be seen in FIG. 4 the belt runs are substantially horizontal.

What I claim as my invention is:

1. In a storage device for an endless belt and the like having a fixed and a movable frame mounted for horizontal movement relative to said fixed frame and having a first set of rollers mounted on said fixed frame and a second set of rollers mounted on said movable frame, said rollers being capable of supporting vertically spaced runs of an endless conveyor belt and the like, the improvement wherein said first and second sets of rollers are mounted on their respective frames parallel to each other and inclined at an acute angle to the horizontal axis of the device, individual rollers of said set on said fixed frame being paired with individual rollers on said set on said moving frame, each pair of rollers having substantially the same center-to-center distance as every other pair, the pairs, in operation, supporting vertically spaced belt and the like runs of substantially equal length.

2. Apparatus as claimed in claim 1 in whidh a third set of rollers is mounted on said fixed frame and a fourth set of rollers is mounted on said movable frame, said third and fourth sets of rollers being capable of supporting vertically spaced runs of an endless belt and the like therebetween and being parallel to each other and inclined to the horizontal axis of the device, in substantially mirror image configuration to said first and second sets of rollers.

3. Apparatus as claimed in claim 2 in which said third and fourth sets of rollers are mounted beneath said first and second sets and in which a fifth set of rollers is mounted on said fixed frame and a sixth set of rollers is mounted on said movable frame, beneath said third and fourth sets of rollers, said fifth and sixth sets of rollers being capable of supporting vertically spaced runs of an endless belt and the like therebetween and being parallel to each other and parallel to said first and second sets of rollers.

4. Apparatus as claimed in claim 1 in which said sets of rollers comprise belt and the like entraining rollers and smaller diameter belt and the like spacing rollers.

5. Apparatus as claimed in claim 1 in which said acute angle is between 10 degrees and 20 degrees.

6. Apparatus as claimed in claim 2 in which said second set of rollers are mounted on said movable frame beneath said first set of fixed rollers and wherein said fourth set of rollers is mounted beneath said second set of rollers and above said third set of rollers, said movable frame being translatable between a position in which the second and fourth sets of rollers fit snugly within the first and third sets of rollers, to an extended belt and the like storage position, individual rollers of said third set of rollers being paired with individual rollers of said fourth set of rollers, the center-to-center distance between each of said pairs of rollers of the said third and fourth sets being substantially the same as the center-to-center distance between every other pair of rollers, the sets of rollers, in operation, supporting vertically spaced belt and the like of substantially equal length.

7. Apparatus as claimed in claim 6 wheren said sets of rollers include belt and the like spacing rollers of smaller diameter than said pairs of rollers.

8. Apparatus as claimed in claim 2 in which said acute angle is between 10 degrees and 20 degrees.

9. Apparatus as claimed in claim 3 in which said acute angle is between 10 degrees and 20 degrees.

10. In a storage device for an endless belt and the like having a fixed and a movable frame mounted for horizontal movement relative to said fixed frame and having a first set of rollers mounted to said fixed frame and a second set of rollers mounted on said movable frame, said rollers being capable of supporting vertically spaced runs of an endless conveyor belt and the like, the improvement wherein said first set of rollers are mounted on said fixed frame inclined at an acute angle to the horizontal axis of the device, and a second set of rollers are mounted on said movable frame, beneath said fixed set of rollers and parallel thereto, individual rollers on said fixed frame, being paired with individual rollers on said movable frame, the center-to-center distance between each pair of rollers being substantially the same as between every other pair of rollers, said movable frame being capable of horizontal movement relative to said fixed frame, from a closed position in which said movable set of rollers is snugly adjacent said fixed rollers to an extended position in which said movable set of rollers are spaced from said fixed set of rollers, said pairs of rollers, in operation, supporting vertically spaced belt and the like runs of substantially equal length.

11. Apparatus as claimed in claim 10 in which said pairs of rollers have belt and the like spacing rollers associated therewith, of a smaller diameter than said pairs of rollers and arranged to maintain a spacing between said belt and the like runs.

* * * * *